3,174,978
GUANYL HYDRAZONES OF DIALKYLAMINO-
PHENYL LOWER ALKYL KETONES
Adrian Marxer, Muttenz, Switzerland, assignor to
Ciba Corporation, a corporation of Delaware
No Drawing. Filed Dec. 29, 1961, Ser. No. 163,087
Claims priority, application Switzerland, Jan. 16, 1961,
464/61; Nov. 30, 1961, 13,931/61
11 Claims. (Cl. 260—319)

The present invention relates to new guanylhydrazones. More especially is concerns N-unsubstituted guanylhydrazones of alkylaminophenyl-ketones, preferably of dialkylaminophenyl-alkylketones, and their salts.

In the new compounds the phenyl radical may also contain further substituents, for example lower alkyl such as methyl, ethyl, propyl or isopropyl groups, unbranched or branched butyl, pentyl or hexyl groups which may be linked in any desired position, lower alkoxy such as methoxy, ethoxy, propoxy, or butoxy groups, halogen-lower alkyl such as trifluoromethyl, or halogen such as fluorine, chlorine or bromine atoms.

The new hydrazones possess valuable pharmacological properties. Inter alia, for example, they are active against inflammations and can therefore be used pharmacologically or as medicaments for animals in treating inflammations. They are also useful as intermediates for the preparation of medicaments.

Particular mention may be made of the compounds of the formula

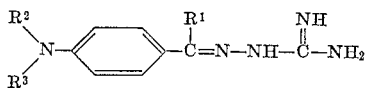

or for the formula

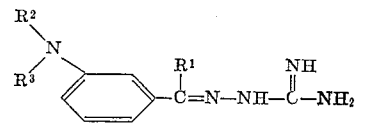

wherein $R^1$, $R^2$ and $R^3$ may be identical or different and represent lower alkyl radicals, such as ethyl groups, or straight or branched propyl, butyl or pentyl radicals, or they may preferably represent methyl groups, and $R^3$ may in the second place represent hydrogen—and their salts, and particularly the p-dimethylamino-acetophenone-guanyl hydrazone and its salts.

The new compounds are prepared by methods known per se. Advantageously a compound of the formula

where Ph represents a phenyl group substituted by an alkylamino group and $R^4$ an unsubstituted or substituted hydrocarbon radical, preferably an alkyl radical is reacted with guanylhydrazine, advantageously in the form of a salt thereof with an acid.

The reaction is performed in the conventional manner, preferably in the presence of a diluent, in the presence or absence of a condensing agent or catalyst, at room temperature or a higher or lower temperature, if desired under superatmospheric pressure.

The starting materials are known or can be prepared by methods known per se.

The afore-mentioned processes can also be performed with derivatives of the starting materials that are converted into the specified starting materials under the reaction conditions employed.

Depending on the reaction conditions used, the new compounds are obtained in the form of the free bases or of salts thereof. Particularly suitable salts are those of therapeutically useful acids, such as inorganic acids, for example hydrohalic acids, for example hydrochloric or hydrobromic acid, perchloric, nitric or thiocyanic acid, sulfuric or phosphoric acids, or organic acids, such as formic, acetic, propionic, glycollic, lactic, pyruvic, oxalic, malonic, succinic, maleic, fumaric, malic, tartaric, citric, ascorbic, hydroxymaleic, dihydroxymaleic, benzoic, phenyl-acetic, 4-aminobenzoic, 4-hydroxybenzoic, anthranilic, cinnamic, mandelic, salicylic, 4-amino-salicylic, 2-phenoxybenzoic, 2-acetoxybenzoic, embonic, methanesulfonic, ethanesulfonic, hydroxyethanesulfonic, benzenesulfonic, p-chlorobenzenesulfonic para-toluenesulfonic, naphthalenesulfonic acid or sulfaminic acids or methionine, trypthophan, lysine or arginine. The salts of the new compounds may also be used for purifying the bases obtained, for example, by converting the bases into their salts, separating the salts and reconverting the latter into the free bases.

Resulting salts can be converted in the conventional manner into the free bases, and free bases into their salts, for example those mentioned above.

The invention includes also any variant of the present process in which an intermediate obtainable at any stage of the process is used as starting material and the remaining step or steps is/are carried out, or the process is discontinued at any stage thereof, or in which a starting material is formed in the course of the reaction.

The new compounds can be used as medicaments, for example in the form of pharmaceutical preparations containing them or their salts in admixture or conjunction with a pharmaceutical organic or inorganic solid or liquid excipient suitable for enteral, parenteral or local administration. Suitable excipients are substances that do not react with the new compounds such, for example, as water, gelatine, lactose, starches, magnesium stearate, talc, vegetable oils, benzyl alcohols, gums, polyalkylene glycols, white petroleum jelly, cholesterol or other known medicinal excipients. The pharmaceutical preparations may be, for example, tablets, dragees, ointments or creams, or in liquid form solutions, suspensions or emulsions. They may be sterilized and/or may contain assistants, such as preserving, stabilizing, wetting or emulsifying agents, salts for regulating the osmotic pressure, or buffers. They may also contain further therapeutically useful substances. The preparations are made by conventional methods. They contain advantageously about 5–90%, especially 20–50%, of active substance, or about 10–100 mg., particularly 40–60 mg., of the active substance per dosage unit.

The following examples illustrate the invention.

*Example 1*

14.0 grams of guanylhydrazine bicarbonate are suspended in 30 ml. of water and dissolved with 16.75 ml. of 6.25 N-hydrochloric acid as the hydrochloride. The solution is treated with 16.32 grams of para-dimethyl-amino-acetophenone and 75 ml. of methanol, and the mixture is heated on a water bath maintained at 85° C. and kept for 3 hours at this temperature. The cooled solution is freed by suction filtration from an initial crystallisate, and the mother liquor is evaporated to a small volume, whereupon a second, more copious crystallisate is obtained. Both crystallisates are recrystallized from 300 ml. of isopropanol with addition of 10 ml. of water. On evaporation of the solution, para-dimethylamino-acetophenone guanyl-hydrazone hydrochloride of the formula

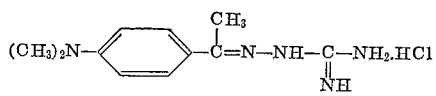

crystallizes out, which melts at 238–240° C.

Example 2

A solution of guanylhydrazine hydrochloride is prepared from 14.0 grams of guanylhydrazine bicarbonate, 30 ml. of water and 16.75 ml. of 6.25 N-hydrochloric acid. The resulting solution is treated with 16.32 grams of meta-dimethylamino-acetophenone and 75 ml. of methanol, and the mixture is stirred for 3 hours at the boil on a water bath maintained at 80° C. The solution is then evaporated in vacuo. The residue crystallizes overnight, and is then recrystallized from 150 ml. of isopropanol, to yield meta-dimethylamino-acetophenone guanylhydrazone hydrochloride of the formula

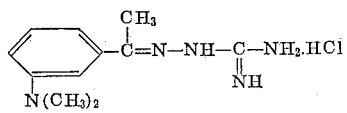

which melts at 196–198° C.

Example 3

16.4 grams of guanylhydrazine bicarbonate are dissolved in 30 ml. of water and 19.8 ml. of 6.25 N-hydrochloric acid and treated with 14.92 grams of para-methylaminoacetophenone in 75 ml. of methanol. The mixture is stirred and heated under reflux for 3 hours, filtered, evaporated to dryness under reduced pressure, and the crystallizing residue shaken in 100 ml. of butanol, whereby complete crystallization takes place. The isolated and dried crystals are then recrystallized from 40 ml. of water to yield pure para-methylaminoacetophenone-guanyl-hydrazone hydrochloride of the formula

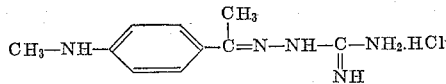

melting at 213–216° C.

Example 4

Tablets containing 50 mg. of active substance may be prepared, for example, with the following ingredients and by the method described below:

Ingredients: Mg.
Para-dimethylaminoacetophenone guanylhydrazone hydrochloride _____ 50.0
Lactose _____ 70.0
Wheat starch _____ 45.0
Gelatine _____ 4.0
Arrowroot _____ 20.0
Magnesium stearate _____ 1.0
Talc _____ 10.0

*Method.*—Para-dimethylaminoacetophenone-guanylhydrazone hydrochloride is mixed homogeneously with lactose and wheat starch and the mixture is passed through a sieve having a mesh of 0.5 mm. Gelatine is dissolved in ten times its quantity of water, the powder mixture homogeneously moistened with the solution and kneaded until a pliable mass is formed. The latter is passed through a sieve having a mesh of 3 mm., dried at a temperature of 45° C. at the most and then passed through a sieve having a mesh of 1.5 mm. To the resulting granulate there are added arrowroot, magnesium stearate and talc in a finely screened form and, after further homogenisation, the mass is compressed in the conventional manner into tablets weighing 200 mg. and of 8 mm. in diameter.

What is claimed is:
1. A member selected from the group consisting of a compound of the formula

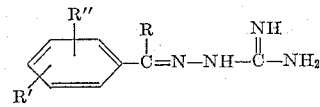

wherein R' stands for a member selected from the group consisting of meta- and para-methylamino and dimethylamino, R stands for methyl and R" stands for hydrogen, and an acid addition salt thereof.

2. A compound of the formula

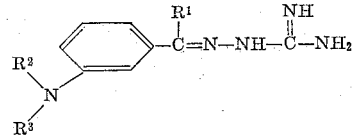

in which $R^1$, $R^2$ and $R^3$ represent lower alkyl radicals.

3. A compound of the formula

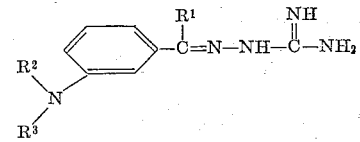

in which $R^1$ and $R^2$ represent lower alkyl radicals and $R^3$ stands for hydrogen.

4. An acid addition salt of a compound claimed in claim 2.

5. An acid addition salt of a compound claimed in claim 3.

6. The compound of the formula

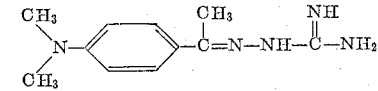

7. An acid addition salt of a compound claimed in claim 6.

8. The compound of the formula

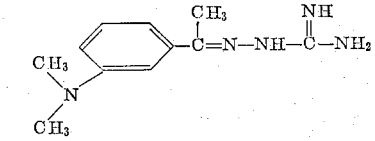

9. An acid addition salt of a compound claimed in claim 7.

10. The compound of the formula

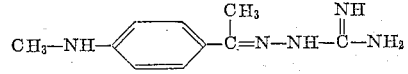

11. An acid addition salt of a compound claimed in claim 10.

References Cited in the file of this patent

Conrad et al.: J.A.C.S., vol. 55, pp. 2867–2870 (1933).
Croshaw et al.: Brit. J. Pharm., vol. 5, pp. 178–187 (1950).

UNITED STATES PATENT OFFICE
CERTIFICATE OF CORRECTION

Patent No. 3,174,978　　　　　　　　　　　　　　March 23, 1965

Adrian Marxer

It is hereby certified that error appears in the above numbered patent requiring correction and that the said Letters Patent should read as corrected, below.

Column 4, line 51, for the claim reference numeral "7" read -- 8 --.

Signed and sealed this 28th day of September 1965.

(SEAL)
Attest:

ERNEST W. SWIDER　　　　　　　　　　　　　　EDWARD J. BRENNER
Attesting Officer　　　　　　　　　　　　　　　Commissioner of Patents